(12) United States Patent
Sun et al.

(10) Patent No.: US 8,964,911 B1
(45) Date of Patent: Feb. 24, 2015

(54) METHOD AND APPARATUS FOR MEASURING INTERFERENCE IN A COMMUNICATION SYSTEM

(71) Applicant: Marvell International Ltd., Hamilton (BM)

(72) Inventors: Yakun Sun, Sunnyvale, CA (US); Raphael Cendrillon, Palo Alto, CA (US); Mingguang Xu, San Jose, CA (US); Hui-Ling Lou, Sunnyvale, CA (US); Christian R. Berger, San Jose, CA (US); Yan Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 59 days.

(21) Appl. No.: 13/684,005

(22) Filed: Nov. 21, 2012

Related U.S. Application Data

(60) Provisional application No. 61/564,229, filed on Nov. 28, 2011.

(51) Int. Cl.
   *H03K 9/00* (2006.01)
   *H04B 1/10* (2006.01)

(52) U.S. Cl.
   CPC .................................. *H04B 1/1027* (2013.01)
   USPC ......................................................... 375/346

(58) Field of Classification Search
   CPC ...................................................... H04B 1/1027
   USPC ......................................................... 375/346
   See application file for complete search history.

(56) References Cited

U.S. PATENT DOCUMENTS

| | | | | |
|---|---|---|---|---|
| 8,094,699 | B2* | 1/2012 | Elezabi | 375/140 |
| 2005/0278609 | A1* | 12/2005 | Kim et al. | 714/780 |
| 2007/0127593 | A1* | 6/2007 | Lee et al. | 375/299 |
| 2008/0019331 | A1* | 1/2008 | Thomas et al. | 370/338 |
| 2009/0227247 | A1* | 9/2009 | Byun et al. | 455/423 |
| 2010/0232553 | A1* | 9/2010 | Gomadam et al. | 375/346 |
| 2013/0176881 | A1* | 7/2013 | Fan et al. | 370/252 |
| 2014/0003479 | A1* | 1/2014 | Huang et al. | 375/224 |

* cited by examiner

*Primary Examiner* — Santiago Garcia

(57) ABSTRACT

Systems, methods, apparatus, and techniques are provided for receiving signals over a communications channel, generating a plurality of successive estimates of instantaneous interference present in the communications channel at a respective plurality of samples based on the received signals, producing an average interference estimate of the interference channel based on the plurality of successive estimates, and producing a decoded codeword based on i) the average interference estimate and ii) the received signals.

20 Claims, 4 Drawing Sheets

METHOD AND APPARATUS FOR MEASURING INTERFERENCE IN A COMMUNICATION SYSTEM

CROSS-REFERENCE TO RELATED APPLICATIONS

This patent document claims the benefit under 35 U.S.C. §119(e) of U.S. Provisional Application No. 61/564,229, filed Nov. 28, 2011, which is incorporated herein by reference.

BACKGROUND OF THE DISCLOSURE

The disclosed technology relates generally to techniques for interference mitigation when decoding codewords at a wireless communications receiver. More particularly, the disclosed technology relates to techniques for determining a time or frequency interval over which interference characteristics of a wireless channel are approximately stationary and for estimating interference properties during that time or frequency interval so that interference can be mitigated during decoding.

Decoding performance in a wireless network is often limited by interference caused by other in- or out-of-network users, e.g., inter-cell interference in a cellular network. Interference mitigation techniques may be used to identify interference characteristics so that interference is reduced and/or partially canceled at a communications receiver, leading to improved decoding performance. However, interference is often non-stationary and frequency selective due to, e.g., non-coordination and asynchronization between interfering transmitters. Furthermore, an estimate of interference is likely to be unreliable if too few samples over a limited time or frequency interval are used to form the estimate. An estimate of interference is also likely to be unreliable if samples on which the estimate is based are taken over too large an interval, i.e., over a time or frequency interval in which the interference exhibits non-stationary characteristics.

SUMMARY OF THE DISCLOSURE

Described herein is a decoding system including receiver circuitry configured to receive signals over a communications channel, a first interference estimator configured to generate, based on the received signals, a plurality of successive estimates of instantaneous interference present in the communications channel at a respective plurality of samples, a second interference estimator communicatively coupled to the first interference estimator, the second interference estimator configured to produce an average interference estimate of the interference present in the communications channel based on the plurality of successive estimates, and a decoder configured to produce a decoded codeword based on i) the average interference estimate and ii) the received signals.

Also described herein are systems, methods, apparatus, and techniques for receiving signals over a communications channel, generating, at a first interference estimator, a plurality of successive estimates of instantaneous interference present in the communications channel at a respective plurality of samples based on the received signals, producing, at a second interference estimator communicatively coupled to the first interference estimator, an average interference estimate of the interference present in the communications channel based on the plurality of successive estimates, and producing, at a decoder, a decoded codeword based on i) the average interference estimate and ii) the received signals.

BRIEF DESCRIPTION OF THE FIGURES

The above and other aspects and advantages will be apparent upon consideration of the following detailed description, taken in conjunction with the accompanying drawings, in which like reference characters refer to like parts throughout, and in which.

DETAILED DESCRIPTION OF THE DISCLOSURE

Accordingly, presented herein are methods, apparatus, and techniques for adaptively tracking interference within a time or frequency interval of measurements during which the interference is approximately stationary. Specifically, methods, apparatus, and techniques are presented for determining a sufficiently large time or frequency measurement interval for which interference characteristics are approximately stationary and for performing interference mitigation based on an average interference estimate from interference samples taken over the determined time or frequency measurement interval.

Figure 1:
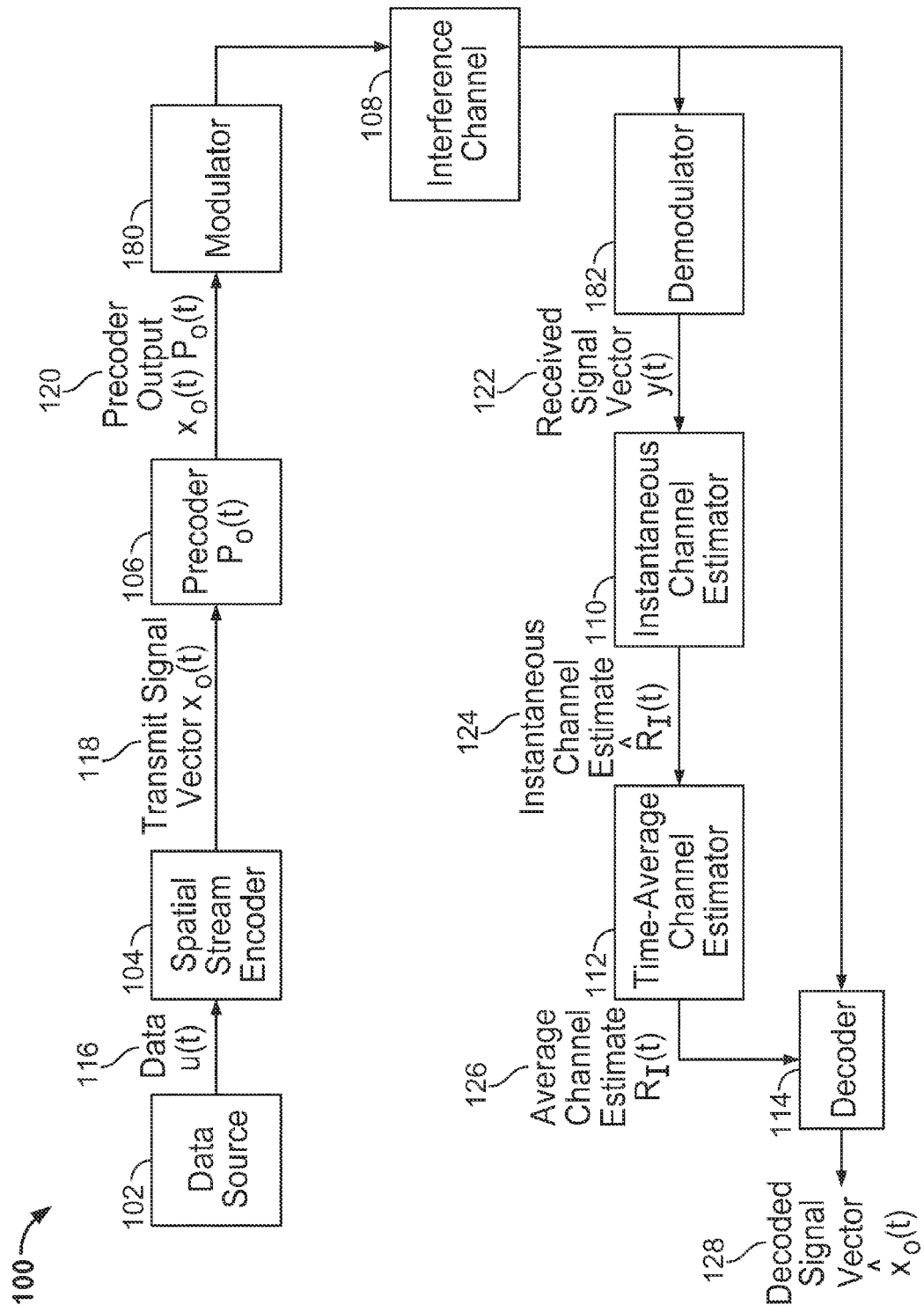
FIG. 1 illustrates an exemplary communications system employing interference mitigation at a receiver side in accordance with an arrangement.

FIG. 1 illustrates an exemplary communications system employing interference mitigation at a receiver side in accordance with an arrangement. Communications system 100 includes data source 102, spatial stream encoder 104, precoder 106, modulator 180, interference channel 108, demodulator 182, instantaneous interference estimator 110, average interference estimator 112, and decoder 114.

The data source 102 produces a serial stream of data u(t) 116. The data u(t) 116 corresponds to any suitable type of data, e.g., voice data, image data, financial data, or program data. Further, in an arrangement, the data u(t) 116 is source encoded prior to being output by the data source 102. Additionally or alternatively, the data u(t) 116 is mapped to modulated symbols prior to being output by the data source 102. Available modulations may include, for example, various implementations of quadrature amplitude modulation (QAM), quadrature phase shift keying (QPSK), and suitable modulation types. Individual data symbols of the data u(t) 116 may be binary or non-binary valued. The data u(t) 116 is provided to the spatial stream encoder 104. The spatial stream encoder 104 converts the serially-arranged data u(t) 116 into a set of $S_0$ parallel data streams. The spatial stream encoder produces the $S_0$ parallel streams using any suitable technique, e.g., round-robin allocation or randomized allocation.

In an arrangement, the spatial stream encoder 104 encodes the data u(t) 116 (i.e., adding a certain number of redundant symbols) prior to converting the serially-arranged data u(t) 116 into the set of $S_0$ parallel data streams. At each symbol period, the spatial stream encoder outputs a parallelized set of $S_0$ symbols in the form transmit signal vector $x_0(t)$ 118, which is an $S_0$-length vector of symbols.

The transmit signal vector $x_0(t)$ 118 is input to precoder $P_0(t)$ 106. The precoder $P_0(t)$ 106 transforms the transmit signal vector $x_0(t)$ 118 by applying the $N_0 \times S_0$ MIMO precoding matrix $P_0(t)$ to the transmit signal vector $x_0(t)$ 118, where $N_0$ is a number of transmit antennas used by the transmitter side of the communications system 100. Specifically, the precoder $P_0(t)$ 106 left-multiplies the transmit signal vector $x_0(t)$ 118 by the precoding matrix $P_0(t)$ to produce precoder output $P_0(t)x_0(t)$ 120, which is a $N_0$-length vector of data, produced each symbol period, where each of the $N_0$ symbols of the precoder output $P_0(t)x_0(t)$ 120 is transmitted on a respective one of $N_0$ transmission antennas. The precoder output $P_0(t)x_0(t)$ 120 is passed to modulator 180, which modulates and up-converts the $N_0$ symbols of the precoder output $P_0(t)x_0(t)$ 120 for transmission over $N_0$ transmission antennas.

The modulated precoder output $P_0(t)x_0(t)$ 120 is transmitted over the interference channel 108, which corrupts a signal waveform of modulated precoder output $P_0(t)x_0(t)$ 120, before being received at the demodulator 182. Specifically, the signal received by the demodulator 182, after demodulation and down-conversion, is referred to as the received signal vector y(t) 122 and is a corrupted version of the precoder output $P_0(t)x_0(t)$ 120. Specifically, the received signal vector y(t) 122 is modeled according to the following relationship $$y(t) = H_0(t)P_0(t)x_0(t) + \sum_{i=1}^{K} H_i(t)P_i(t)x_i(t) + n(t) \quad (1)$$

where y(t) is a $N_R \times 1$ data vector, with $N_R$ denoting the number of receive antennas employed by the demodulator 182, and $H_i(t)$ is an $N_R \times N_i$ multiple-input multiple-output (MIMO) channel matrix. Thus, the quantity $H_0(t)P_0(t)x_0(t)$ appearing in equation (1) denotes the signal transmitted from the modulator 180 after being attenuated by the interference channel 108. Further, the equation (1) includes terms that capture both additive noise and the effect of interference on the received signal vector y(1) 122. In particular, n(t) represents a $N_R \times 1$ vector of additive white Gaussian noise (AWGN) samples, i.e., having zero cross-correlation according to $E[n(t)n^H(t)] = \sigma^2 I_{N_R}$, where σ is the variance of each noise sample in the vector n(t) and $I_{N_R}$ is an identity matrix of size $N_R$.

In equation (1), the quantity $$\sum_{i=1}^{K} H_i(t)P_i(t)x_i(t)$$

represents the effect of K interfering users upon the received signal vector y(t) 122. Specifically, similarly to how the quantity $H_0(t)P_0(t)x_0(t)$ denotes the signal transmitted from the modulator 180 as it is received at the demodulator 182, the quantity $H_i(t)P_i(t)x_i(t)$, for $1 \leq i \leq K$, denotes a signal transmitted from an $i^{th}$ interfering transmitter as it is received at the demodulator 182. That is, the quantity $P_i(t)x_i(t)$ denotes a precoder output at transmission antennas of the $i^{th}$ interfering transmitter and $H_i(t)P_i(t)x_i(t)$ denotes the signal transmitted from the $i^{th}$ interfering user as it is received at the demodulator 182, where $x_i(t)$ is a $S_i \times 1$ transmit signal vector at the $i^{th}$ interferer, $H_i(t)$ is an $N_R \times N_i$ MIMO channel with Ni denoting a number of transmit antennas at the $i^{th}$ interferer, and $P_i(t)$ is a $N_i \times S_i$ MIMO precoding matrix employed by the $i^{th}$ interferer, where $S_i$ is the number of spatial streams at the $i^{th}$ interferer. Equation (1) may be rewritten so that the received signal vector y(t) 122 is expressed $$y(t) = \tilde{H}_0(t)x_0(t) + \sum_{i=1}^{K} \tilde{H}_i(t)x_i(t) + n(t) \quad (2)$$

where $\tilde{H}_i(t) = H_i(t)P_i(t)$ is an $N_R \times S_i$ effective MIMO channel.

As would be understood by one of ordinary skill in the art, based on the disclosure and teachings herein, the values of the precoding matrices $P_i(t)$, for $i \geq 1$, may not be known at the receiver side of the communications system 100. Further, the index t used to parameterize the functions above need not refer to time. In various arrangements, the index t may refer a symbol or block index, a frequency subcarrier or subchannel index, or any suitable parameterization basis (including time). Nevertheless, for convenience and not by way of limitation, the index t will be referred to as "time" throughout this disclosure for brevity.

The decoding performance of a wireless receiver is often limited by the effects of interference, i.e., the term $$\sum_{i=1}^{K} \tilde{H}_i(t)x_i(t)$$

in equation (2) (hereinafter, "the interference term"), and interference mitigation techniques may be used to determine and/or compensate for this interference and thus improve decoding performance. For example, the interference term, or some algebraic manipulation of the interference term, may be estimated and the estimate used to compensate the effect of interference at the receiver side of the communications system 100. In such a scenario, it is important that the interference term be estimated using data samples taken from a time or frequency interval over which a statistical characterization of the interference term is stationary (or approximately stationary). If the interference term is estimated based on interference samples taken from a larger time or frequency interval, the estimate will poorly reflect the actual interference, and mitigation attempts will provide potentially poor decoding performance. Similarly, if the interference term is estimated over a shorter time period, an insufficient number of samples may be used to create the estimate, and so mitigation attempts will again likely provide poor performance. Therefore, in estimating the interference term of equation (2), it is advantageous to determine whether the underlying interference term is changing or has changed sufficiently much (as a proxy for measuring the stationarity of the interference term) and modify the estimate of the interference term accordingly.

Accordingly, the received signal vector y(t) 122 is provided to the instantaneous interference estimator 110, which provides an estimate of the instantaneous state of the interference term of equation (2). More precisely, for reasons that will be further described below, the instantaneous interference estimator 110, at a time t, estimates the quantity $$V(t) = \sum_{i=1}^{K} \tilde{H}_i(t)\tilde{H}_i^H(t) + \sigma^2 I_{N_R}.$$

The instantaneous interference estimator 110 estimates V(t) once every measurement period and outputs a corresponding instantaneous interference estimate $\hat{R}_I(t)$ 124. In particular, letting each measurement period be equal to a time period of t=1 (with suitable scaling and without loss of generality), the instantaneous interference estimator 110 outputs estimates $\hat{R}_I(1)$ through $\hat{R}_I(q)$ of V(1) through V(q), respectively, where q is a suitably large integer. The instantaneous interference estimator 110 may use any suitable technique to estimate V(t). In arrangement, the instantaneous interference estimator 110 makes a minimum-mean square error (MMSE) estimate of V(t).

Next, the instantaneous interference estimate $\hat{R}_I(t)$ 124 is provided to average interference estimator 112, which outputs an average interference estimate $R_I(t)$ 126. In particular, the average interference estimate $R_I(t)$ 126 is based on the instantaneous interference estimate $\hat{R}_I(t)$ 124 at the current time (measurement period) and at previous times (previous measurement periods). For example, in an arrangement, $R_I(5)$ is based on $\hat{R}_I(1)$ through $\hat{R}_I(5)$. Techniques employed by average interference estimator 112 to produce the average interference estimate $R_I(t)$ 126 in accordance with various arrangements are discussed in relations to FIGS. 2-4, respectively.

As depicted in FIG. 1, both the average interference estimate $R_I(t)$ 126 and the received signal vector y(t) 122 are provided to the decoder 114, and the decoder 114 produces estimated signal vector $\hat{x}_0(t)$ 128, i.e., an estimate of the transmit signal vector $x_0(t)$ 118, based on these quantities. In an arrangement, the decoder 114 produces the estimated signal vector $\hat{x}_0(t)$ 128 according to the relationship $$\hat{x}_0(t) = \tilde{H}_0^H(t)(\tilde{H}_0(t)\tilde{H}_0^H(t) + R_I(t))^{-1}y(t).$$

In an arrangement, the decoder 114 produces the signal vector $\hat{x}_0(t)$ 128 based on a linear minimum mean square error estimate of the received signal vector y(t) 122 parameterized by the average interference estimate $R_I(t)$ 126. In alternative arrangements, the average interference estimate 126 parameterizes other types of detectors, including a maximum-likelihood detector, maximum ratio combining detector, and decision-directed detector.

As described above, generally, the more stationary samples of the instantaneous interference estimate $\hat{R}_I(t)$ 124 used by the average interference estimator 112 in computing the average interference estimate $R_I(t)$ 126, the more accurate the estimate of the interference term will be. However, the coherence time or frequency (i.e., the time or frequency interval over which the inference term remains an approximately stationary process) is generally unknown to the receiver side of the communications system 100 and using samples of the instantaneous interference estimate $\hat{R}_I(t)$ 124 over a non-stationary interval will generally result in a less accurate estimate of the interference term. Accordingly, what follows next are three illustrative techniques by which the average interference estimator 112 may determine the average interference estimate $R_I(t)$ 126 based on averaging samples of the instantaneous interference estimate $\hat{R}_I(t)$ 124 taken over a time or frequency interval empirically determined to correspond approximately to the maximum stationary interval of the interference term.

Figure 2:
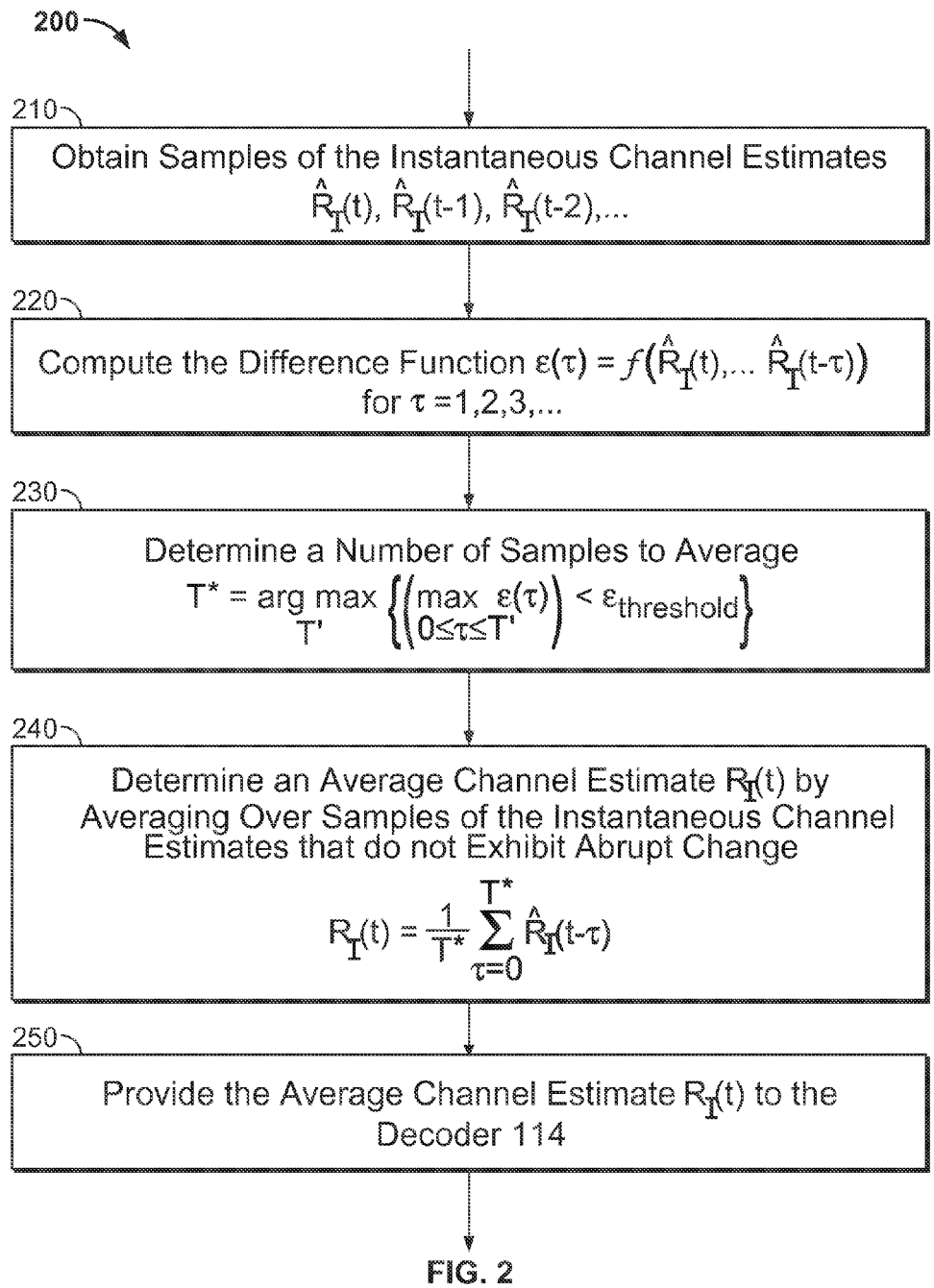
FIG. 2 illustrates an exemplary process by which an average interference estimator produces an average interference estimate based on one or more samples of an instantaneous interference estimate in accordance with an arrangement.

FIG. 2 illustrates an exemplary process 200 by which the average interference estimator 112 produces an average interference estimate $R_I(t)$ 126 based on one or more samples of the instantaneous interference estimate $\hat{R}_I(t)$ 124 in accordance with an arrangement. Process 200 may be primarily implementing in hardware or software executed by the average interference estimator 112. At 210, the average interference estimator 112 obtains a number of current and past samples of the instantaneous interference estimate $\hat{R}_I(t)$ 124. In particular, when operating at the $t^{th}$ measurement period, the average interference estimator 112 obtains the current sample of the instantaneous interference estimate, $\hat{R}_I(t)$, as well as past samples $\hat{R}_I(t-1)$, $\hat{R}_I(t-2)$, $\hat{R}_I(t-3)$, . . . . In an arrangement, the number of past samples obtained by the average interference estimator 112 may depend on computational complexity constraints, e.g., an available amount of system memory or an implied processing time required to perform the remaining functions of the process 200. The number of past samples obtained by the average interference estimator 112 generally depends also on certain physical constraints on the nature of communications, e.g., a handover to a new serving cell will limit a number of past samples obtained.

At 220, the average interference estimator 112 computes the difference function $$\epsilon(\tau) = f(\hat{R}_I(t), \hat{R}_I(t-\tau))$$

between the current sample of the instantaneous interference estimate $\hat{R}_I(1)$ 124 and lagged values of the instantaneous interference estimate $\hat{R}_I(t-\tau)$ 124 for $\tau=1, 2, 3, \ldots$ . In particular, the function $f(\hat{R}_I(t), \hat{R}_1(t-\tau))$ provides a measure of the difference between the matrices $\hat{R}_I(t)$ and $\hat{R}_I(t-\tau)$. Any suitable function that provides such a measure may be used, and several examples of the difference function are provided subsequently. Additionally or alternatively, the difference function measures the difference over a duration of samples, which may include two or more samples of instantaneous interference. That is, the difference function $$\epsilon(\tau) = f(R_I(t), \ldots, R_I(t-\tau+\tau'), \ldots, \hat{R}_I(t-\tau)); \quad 0 \leq \tau' \leq \tau$$

measures an arbitrary number of samples from t−τ to t.

At 230, the average interference estimator 112 determines a number of current and (possibly) past samples of the instantaneous interference estimate $\hat{R}_I(t)$ 124 over which the average interference estimate $R_I(t)$ 126 is to be based. In an arrangement, the number of samples is determined based on the difference function values computed at 220 in such a way as to ensure that the maximum difference value between any two of those samples is below a threshold (i.e., that the set of instantaneous interference estimates used in computing the average interference estimate $R_I(t)$ 126 do not deviate too much from one another). Specifically, the number samples is chosen to be the largest number T* such the maximum difference value between any two of the samples is below the threshold value $\epsilon_{threshold}$, i.e., $$T^* = \underset{T'}{\operatorname{argmax}}\left\{\left(\max_{0 \leq \tau \leq T'} \epsilon(\tau)\right) < \epsilon_{threshold}\right\}.$$

In an arrangement, a fixed number of samples may be predetermined and the difference function values computed at 220 are used to decide if the samples within the pre-determined duration deviate sufficiently from one another. If so, $\tau_0$ is chosen to be the fixed number of samples. otherwise T* is set to be value of one. That is, $$T^* = \begin{cases} \tau_0 & \varepsilon(\tau_0) \le \varepsilon_{threshold} \\ 1 & \text{otherwise} \end{cases}$$

At 240, the average interference estimator 112 computes the average interference estimate $R_I(t)$ 126 by averaging a number of the most recent instantaneous interference estimates equal to the largest number T* determined at 230. That is, the average interference estimator 112 computes the average interference estimate $R_I(t)$ 126 according to the relationship $$R_I(t) = \frac{1}{T^*} \sum_{\tau=0}^{T^*} \hat{R}_I(t-\tau). \qquad (3)$$

At 250, the average interference estimator 112 provides the average interference estimate $R_I(t)$ 126 computed at 240 to the decoder 114 for further processing. As described above, the process 200 either fully includes or fully excludes each lagged value of the instantaneous interference estimate $\hat{R}_I(t-\tau)$ based on the threshold value $\epsilon_{threshold}$. Accordingly, the process 200 is referred to as a hard-decision method for computing the average interference estimate $R_I(t)$ 126.

Figure 3:
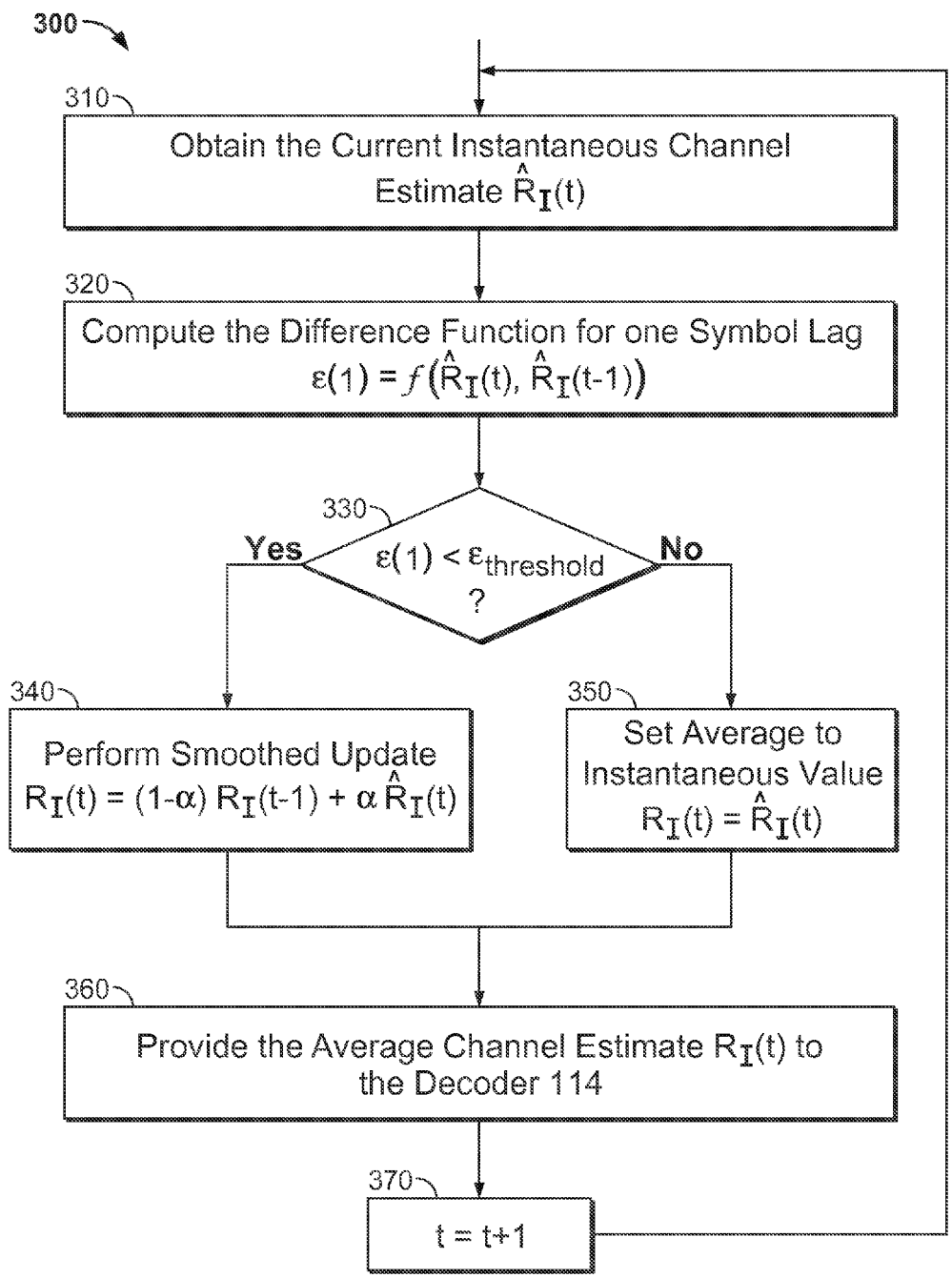
FIG. 3 illustrates another exemplary process by which an average interference estimator produces an average interference estimate based on one or more samples of an instantaneous interference estimate in accordance with an arrangement.

FIG. 3 illustrates another exemplary process, i.e., process 300, by which the average interference estimator 112 produces an average interference estimate $R_I(t)$ 126 based on the instantaneous interference estimate $\hat{R}_I(t)$ 124 in accordance with an arrangement. Process 300 may be primarily implemented in hardware or software executed by the average interference estimator 112. At 310, when operating at the $t^{th}$ measurement period, the average interference estimator 112 obtains the current instantaneous interference estimate, i.e., the instantaneous interference estimate $\hat{R}_I(t)$ 124.

At 320, the average interference estimator 112 computes the difference function, described in connection with FIG. 2 above, for the input value of 1, i.e., between a current sample of the instantaneous interference estimate, $\hat{R}_I(t)$, and a previous sample, $\hat{R}_I(t-1)$. That is, the average interference estimator 112 computes $\epsilon(1)=f(\hat{R}_I(t),\hat{R}_I(t-1))$. At 330, the average interference estimator 112 evaluates the Boolean condition $\epsilon(1) < \epsilon_{threshold}$. If the condition is satisfied, this provides an indication that the underlying interference channel is not changing rapidly and therefore that the interference is approximately stationary over the time interval spanned by the most recent measurements. Accordingly, if $\epsilon(1) < \epsilon_{threshold}$, the process 300 proceeds to 340, where the average interference estimate $R_I(t)$ 126 for the current measurement t is determined according to the relationship $$R_I(t)=(1-\alpha)R_I(t-1)+\alpha \hat{R}_I(t). \qquad (4)$$

Thus, as indicated by equation (4), when the interference is approximately stationary over the measurement interval spanned by the most recent measurements, the current average interference estimate, i.e., $R_I(t)$, is a linearly weighed combination of the average interference estimate computed during the last measurement period, i.e., $R_I(t-1)$, and the current instantaneous interference estimate obtained from the instantaneous interference estimator 110, i.e., the instantaneous interference estimate $\hat{R}_I(t)$ 124. The relative weight of these two quantities is determined by the value of the coefficient $\alpha \in (0,1)$. Specifically, larger values of $\alpha$ weigh the instantaneous interference estimate $\hat{R}_I(t)$ 124 more heavily, while smaller values of $\alpha$ weigh the one-sample lagged average interference estimate $R_I(t-1)$ 126 more heavily. Equation (4) represents a soft-decision approach to updating the average interference estimate $R_I(t)$ 126.

On the other hand, if it is determined that $\epsilon(1) \le \epsilon_{threshold}$ at 330, this provides an indication that the underlying interference channel is changing rapidly and therefore that the interference may be non-stationary over the measurement period spanned by the most recent measurement period. In this case, the process 300 proceeds to 350, where the current average interference estimate $R_I(t)$ 126 is set equal to the current instantaneous interference estimate $\hat{R}_I(t)$ 124. That is, if the channel is determined to be non-stationary at 330, then past samples of the channel are not used in determining in the current average interference estimate $R_I(t)$ 126. From 340 and 350, the process 300 proceeds to 360.

At 360, the average interference estimator 112 provides the average interference estimate $R_I(t)$ 126 computed at either 340 or 350 to the decoder 114 for further processing. The process 300 then proceeds to 370, where the value of t is incremented by 1, and the process 300 returns to 310 in order to produce an average interference estimate $R_I(t)$ 126 for the next measurement period.

Figure 4:
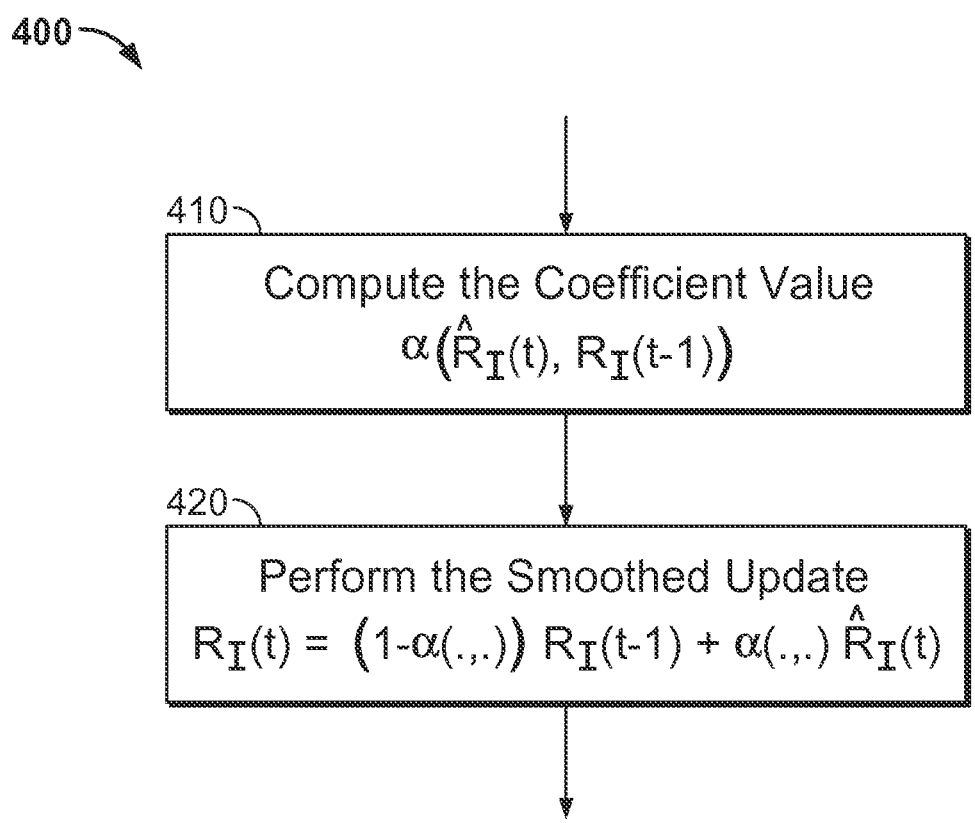
FIG. 4 illustrates a technique for performing a smoothed update of an average interference estimate in which a coefficient depends on an instantaneous interference estimate and an average interference estimate computed during a last symbol period in accordance with an arrangement.

In an arrangement, the coefficient $\alpha$ may be a constant value that is set prior to the execution of the process 300 independently of the instantaneous interference estimate $\hat{R}_I(t)$ 124 and the average interference estimate computed during the last measurement period, i.e., $R_I(t-1)$. However, in an alternate arrangement, the coefficient $\alpha$ may instead depend on $\hat{R}_I(1)$ and/or $R_i(t-1)$. In particular, FIG. 4 illustrates a more detailed technique for performing a smoothed update of the average interference estimate in which the coefficient $\alpha$ depends on the instantaneous interference estimate $\hat{R}_I(t)$ 124 and the average interference estimate computed during the last measurement interval $R_i(t-1)$ in accordance with an arrangement.

At 410, the value $\alpha(\hat{R}_I(t), R_I(t-1))$ is computed. Specifically, the function $\alpha(.,.)$ may be any suitable function having the property that as the "change" in interference increases, i.e., between $R_I(t-1)$ and $\hat{R}_I(t)$ increases, the value of $\alpha(.,.)$ tends to decrease. For example, in one arrangement, the function $\alpha(.,.)$ is defined through the relationship $$\alpha(\hat{R}_I, R_I(t-1))=1-\exp(-f(\hat{R}_I(t), R_I(t-1))), \qquad (5)$$

where the function $f(.,.)$ is the difference function over the current instantaneous interference estimate and the average interference estimate computed during the last measurement interval, which is further described below.

At 420, the average interference estimate $R_I(t)$ 126 for the current symbol t is determined according to the relationship $$R_I(t)=(1-\alpha(.,.))R_I(t-1)+\alpha(.,.)\hat{R}_I(t).$$

where $\alpha(.,.)$ is as specified in equation (5).

The difference function $f(\hat{R}_I(t),\hat{R}_I(t-\tau))$ may be defined in any suitable way that captures the concept of distance between its two inputs. In one arrangement, the function $f(\hat{R}_I(t),\hat{R}_1(t-\tau))$ is defined according to the relationship $$f(\hat{R}_I(t), \hat{R}_I(t-\tau)) = |\eta(t-\tau) - \eta(t)|$$

where $$\eta(t) = \frac{\lambda_{min}(\hat{R}(t))}{\lambda_{max}(\hat{R}(t))},$$

where $\lambda_{min}(A)$ is a minimum eigenvalue of the matrix A and $\lambda_{max}(A)$ is a maximum eigenvalue of the matrix A. Thus, in this arrangement, if the difference in the eigenvalue ratios between the two estimates is small enough, it is assumed that the interference channel remains stationary during the time period spanning the two estimates.

In another arrangement, in which there are two receive antennas, i.e., $N_R=2$, the inputs to the function $f(\hat{R}_I(t),\hat{R}_I(t-\tau))$ may be expressed $$\hat{R}_I(t) = \begin{bmatrix} r_{11}(t) & r_{12}(t) \\ r_{12}^*(t) & r_{22}(t) \end{bmatrix}$$

and $$\hat{R}_I(t-\tau) = \begin{bmatrix} r_{11}(t-\tau) & r_{12}(t-\tau) \\ r_{12}^*(t-\tau) & r_{22}(t-\tau) \end{bmatrix},$$

and the function $f(\hat{R}_I(t),\hat{R}_I(t-\tau))$ is defined according to the relationship $$f(\hat{R}_I(t), \hat{R}_I(t-\tau)) = |\eta(t-\tau) - \eta(t)|$$

where $$\eta(t) = \frac{|r_{12}(t)|^2}{r_{11}(t)r_{22}(t)}.$$

In this arrangement, it is a ratio of the off-diagonal terms over the diagonal terms of the input matrices that is used to characterize whether the interference channel is stationary. Alternatively, the difference may be taken over between the two matrices before the ratio is computed. That is, $$f(\hat{R}_I(t),\hat{R}_I(t-\tau))=|\eta(E \circ E^*)| \text{ where } E=\hat{R}_I(t)-\hat{R}_I(t-\tau)$$

and $A \circ B$ is the Hadamard (element-wise) product of the two matrices, and $A^*$ is the complex conjugated matrix of $A$.

In yet another arrangement, the function $f(\hat{R}_I(t),\hat{R}_I(t-\tau))$ is defined according to the relationship $$f(\hat{R}_I(t), \hat{R}_I(t-\tau)) = \frac{\|\hat{R}_I(t) - \hat{R}_I(t-\tau)\|_p}{\|\hat{R}_I(t)\|_p},$$

where $\|A\|_p$ denotes the p-norm of the matrix $A$. In this arrangement, it is a ratio of the absolute change in the interference estimate matrix over the value of the matrix at the current instance that characterizes whether the interference is stationary.

Similarly, in other arrangements, $f(\hat{R}_I(t),\hat{R}_I(t-\tau))$ may be a distance-based measure. For example, in one arrangement, $f(\hat{R}_I(t),\hat{R}_I(t-\tau))$ specifies a chordal distance $$f(\hat{R}_I(t), \hat{R}_I(t-\tau)) = \frac{1}{\sqrt{2}}\|\hat{R}_I(t)\hat{R}_I^H(t) - \hat{R}_I(t-\tau)\hat{R}_I^H(t-\tau)\|_F. \quad (6)$$

In another arrangement, $f(\hat{R}_I(t),\hat{R}_I(t-\tau))$ specifies a Fubini-Study distance $$f(\hat{R}_I(t),\hat{R}_I(t-\tau))=\arccos|det(\hat{R}(t)\hat{R}^H(t-\tau))|. \quad (7)$$

In another arrangement, $f(\hat{R}_I(t),\hat{R}_I(t-\tau))$ specifies a projection two-norm distance $$f(\hat{R}_I(t),\hat{R}_I(t-\tau))=\|\hat{R}(t)\hat{R}^H(t)-\hat{R}(t-\tau)\hat{R}^H(t-\tau)\|_2. \quad (8)$$

Further, each of the functions in equations (6)-(8) may be normalized by interference power, resulting in the following respective alternate distance metrics $$f(\hat{R}_I(t), \hat{R}_I(t-\tau)) = \frac{\frac{1}{\sqrt{2}}\|\hat{R}_I(t)\hat{R}_I^H(t) - \hat{R}_I(t-\tau)\hat{R}_I^H(t-\tau)\|_F}{\prod_i [\hat{R}_I(t)]_{ii}}$$

for the normalized chordal distance, where $$\prod_i [\hat{R}_I(t)]_{ii}$$

is the element-wise product of all diagonal elements of the matrix $\hat{R}_I(t)$, $$f(\hat{R}_I(t), \hat{R}_I(t-\tau)) = \frac{\arccos|det(\hat{R}(t)\hat{R}^H(t-\tau))|}{\prod_i [\hat{R}_I(t)]_{ii}}$$

for the normalized Fubini-Study distance, and $$f(\hat{R}_I(t), \hat{R}_I(t-\tau)) = \frac{\|\hat{R}(t)\hat{R}^H(t) - \hat{R}(t-\tau)\hat{R}^H(t-\tau)\|_2}{\prod_i [\hat{R}_I(t)]_{ii}},$$

for the normalized projection two-norm distance.

It should be noted that the forms of the difference function $f(\hat{R}_I(t),\hat{R}_I(t-\tau))$ shown above are for example only, and any other forms of a difference function may be used in alternate arrangements. It should also be noted that after replacing the previous instantaneous interference estimate $\hat{R}_I(t-\tau)$ with the previous average interference estimate $R_I(t-\tau)$, that the above examples may also be applied to the soft-decision approach (e.g., when r=1).

It should be noted that for the case where more than two estimates are used in the difference function, various approaches may be implemented. In an arrangement, an average of the difference function values of a pair of two instantaneous interference estimates may be used. That is, $$f(\hat{R}_I(t), \ldots, \hat{R}_I(t-\tau+\tau'), \ldots, \hat{R}_I(t-\tau)) =$$
$$\frac{1}{M}\sum_{\tau',\tau''} f(\hat{R}_I(t-\tau+\tau'), \hat{R}_I(t-\tau+\tau''))$$

where M is a number of pair-wise difference computed. In another arrangement, an average of the difference function values of an instantaneous interference estimate and the average interference estimate across this window may be used. That is, $$f(\hat{R}_I(t), \ldots, \hat{R}_I(t-\tau+\tau'), \ldots, \hat{R}_I(t-\tau)) =$$
$$\frac{1}{\tau+1}\sum_{\tau'} f\left(\hat{R}_I(t-\tau+\tau'), \frac{1}{\tau+1}\sum_{\tau''=0}^{\tau} R_I(t-\tau+\tau'')\right)$$

In yet another arrangement, the maximum difference may be used for any difference function values computed between a pair of instantaneous interference estimates. That is, $$f(\hat{R}_I(t), \ldots, \hat{R}_I(t-\tau+\tau'), \ldots, \hat{R}_I(t-\tau)) =$$
$$\max_{\tau',\tau''} f(\hat{R}_I(t-\tau+\tau'), \hat{R}_I(t-\tau+\tau''))$$

Alternatively, the maximum difference may be calculated between one instantaneous interference estimate and the average interference estimate in the window. That is, $$f(\hat{R}_I(t), \ldots, \hat{R}_I(t-\tau+\tau'), \ldots, \hat{R}_I(t-\tau)) =$$
$$\max_{\tau'} f\left(\hat{R}_I(t-\tau+\tau'), \frac{1}{\tau+1}\sum_{\tau''=0}^{\tau} R_I(t-\tau+\tau'')\right)$$

Furthermore, the difference function taking more than two instantaneous estimates as input may output more than one difference value. In one arrangement, each difference of an instantaneous interference estimate and the average interference estimate may be provided. That is, $$f(\hat{R}_I(t), \ldots, \hat{R}_I(t-\tau+\tau'), \ldots, \hat{R}_I(t-\tau)) =$$
$$\left\{ f\left(\hat{R}_I(t-\tau+\tau'), \frac{1}{\tau+1}\sum_{\tau'=0}^{\tau} R_I(t-\tau-\tau'')\right); \tau' = 0 \ldots \tau \right\}$$

After the difference function is computed, the number of samples to average may be decided for the measurement periods covered in the window either jointly or separately. That is, one unified number of samples to average may be used for all measurement periods covered in the window, if a joint decision is made or one individual number of samples to average may be used for each measurement period in the window, if an individual decision is made.

The above described implementations are presented for the purposes of illustration and not of limitation. Other embodiments are possible and one or more parts of techniques described above may be performed in a different order (or concurrently) and still achieve desirable results. In addition, techniques of the disclosure may be implemented in hardware, such as on an application specific integrated circuit (ASIC) or on a field-programmable gate array (FPGA). The techniques of the disclosure may also be implemented in software.

What is claimed is:

1. A decoding system comprising:
   receiver circuitry configured to receive signals over a communications channel;
   a first interference estimator configured to generate, based on the received signals, a plurality of successive estimates of instantaneous interference present in the communications channel at a respective plurality of samples;
   a second interference estimator communicatively coupled to the first interference estimator, the second interference estimator configured to produce an average interference estimate of the interference present in the communications channel based on the plurality of successive estimates and to compute a difference value between a current estimate of instantaneous interference present in the communications channel and a one-measurement lag average estimate of instantaneous interference present in the communications channel; and
   a decoder configured to produce a decoded codeword based on i) the average interference estimate and ii) the received signals.

2. The decoding system of claim 1, wherein the second interference estimator is further configured to compute a difference value between a current estimate of instantaneous interference present in the communications channel and each of a plurality of available estimates of instantaneous interference present in the communications channel to produce a respective plurality of difference function values.

3. The decoding system of claim 2, wherein the second interference estimator is further configured to determine a number of successive estimates of instantaneous interference to include in a determination of the average interference estimate based on the plurality of difference function values.

4. The decoding system of claim 1, wherein the second interference estimator is further configured to include an estimate of instantaneous interference in a determination of the average interference estimate only if a difference function corresponding to the estimate of instantaneous interference is less than a threshold value.

5. The decoding system of claim 1, wherein the second interference estimator is further configured to:
   compare the difference value to a threshold value;
   perform a smoothed update to an average interference estimate of the interference present in the communications channel if the difference value is less than the threshold value; and
   set the average interference estimate equal to the current estimate of instantaneous interference present in the communications channel if the difference value is greater than or equal to the threshold value.

6. The decoding system of claim 5, wherein the smoothed update to the average interference estimate of the interference present in the communications channel is a linearly weighted sum of: the current estimate of instantaneous interference present in the communications channel, and a previous average interference estimate of the interference present in the communications channel.

7. The decoding system of claim 1, wherein the decoder is further configured to produce the decoded codeword based on an estimate of the received signals parameterized by the average interference estimate, and wherein the estimate of the received signals is of a type selected from the group consisting of a linear minimum mean square error estimate, a maximum likelihood estimate, a maximum ratio combining estimate, and a decision-directed estimate.

8. The decoding system of claim 2, wherein the difference value is based on eigenvalues of each of a plurality of covariance matrices associated with the plurality of estimates of instantaneous interference present in the communications channel on which the average interference estimate is based.

9. The decoding system of claim 2, wherein the difference value is based on an absolute change in a value of a covariance matrix associated with the current estimate of instantaneous interference present in the communications channel relative to at least one of:
   a covariance matrix associated with an average estimate of instantaneous interference present in the communications channel, and
   a covariance matrix associated with one of a plurality of estimates of instantaneous interference present in the communications channel, on which the average interference estimate is based.

10. A method comprising:
    receiving signals over a communications channel;

generating, at a first interference estimator, a plurality of successive estimates of instantaneous interference present in the communications channel at a respective plurality of samples based on the received signals;

producing, at a second interference estimator communicatively coupled to the first interference estimator, an average interference estimate of the interference present in the communications channel based on the plurality of successive estimates;

computing a difference value between a current estimate of instantaneous interference present in the communications channel and a one-measurement lag average estimate of instantaneous interference present in the communications channel; and producing, at a decoder, a decoded codeword based on i) the average interference estimate and ii) the received signals.

11. The method of claim 10, further comprising computing a difference value between a current estimate of instantaneous interference present in the communications channel and each of a plurality of available estimates of instantaneous interference present in the communications channel to produce a respective plurality of difference function values.

12. The method of claim 11, further comprising determining a number of successive estimates of instantaneous interference to include in a determination of the average interference estimate based on the plurality of difference function values.

13. The method of claim 10, further comprising including an estimate of instantaneous interference in a determination of the average interference estimate only if a difference function corresponding to the estimate of instantaneous interference is less than a threshold value.

14. The method of claim 10, further comprising:
comparing the difference value to a threshold value;
performing a smoothed update to an average interference estimate of the interference present in the communications channel if the difference value is less than the threshold value; and
setting the average interference estimate equal to the current estimate of instantaneous interference present in the communications channel if the difference value is greater than or equal to the threshold value.

15. The method of claim 14, wherein the smoothed update to the average interference estimate of the interference present in the communications channel is a linearly weighted sum of: the current estimate of instantaneous interference present in the communications channel, and a previous average interference estimate of the interference present in the communications channel.

16. The method of claim 10, further comprising producing the decoded codeword based on an estimate of the received signals parameterized by the average interference estimate, and wherein the estimate of the received signals is of a type selected from the group consisting of a linear minimum mean square error estimate, a maximum likelihood estimate, a maximum ratio combining estimate, and a decision-directed estimate.

17. The method of claim 11, wherein the difference value is based on eigenvalues of each of a plurality of covariance matrices associated with the plurality of estimates of instantaneous interference present in the communications channel on which the average interference estimate is based.

18. The method of claim 11, wherein the difference value is based on an absolute change in a value of a covariance matrix associated with the current estimate of instantaneous interference present in the communications channel relative to at least one of:
a covariance matrix associated with an average estimate of instantaneous interference present in the communications channel, and
a covariance matrix associated with one of a plurality of estimates of instantaneous interference present in the communications channel, on which the average interference estimate is based.

19. The decoding system of claim 1, wherein the second interference estimator produces the average interference estimate based at least in part on whether the estimates of instantaneous interference are substantially stationary.

20. The method of claim 10, wherein the second interference estimator produces the average interference estimate based at least in part on whether the estimates of instantaneous interference are substantially stationary.

* * * * *